B. P. MULLOY.
MEASURING AND WEIGHING MACHINE.
APPLICATION FILED JULY 27, 1908.
924,570.
Patented June 8, 1909.
5 SHEETS—SHEET 3.
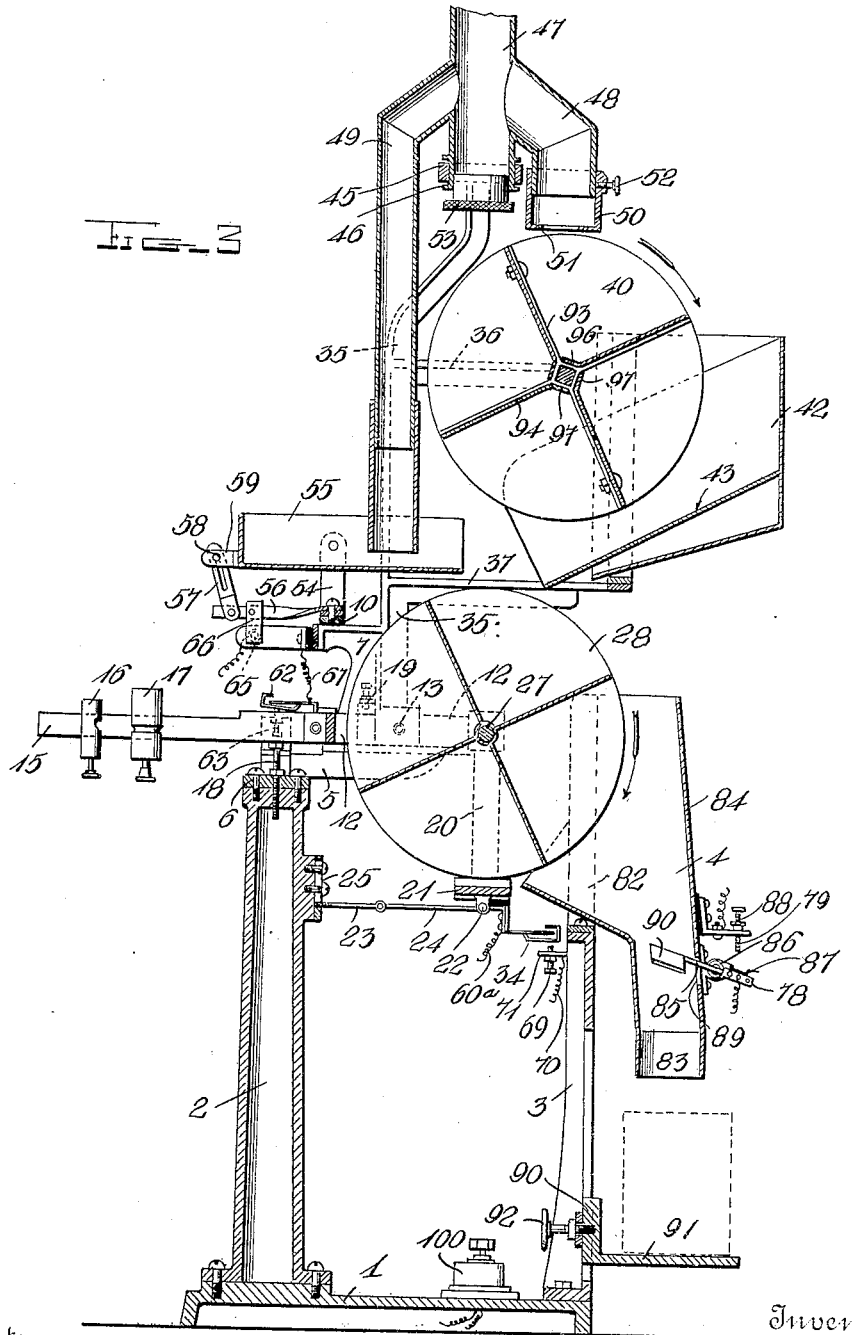
Witnesses
Inventor
B. P. Mulloy
Attorneys B. P. MULLOY.
MEASURING AND WEIGHING MACHINE.
APPLICATION FILED JULY 27, 1908.
924,570.
Patented June 8, 1909.
5 SHEETS—SHEET 4.
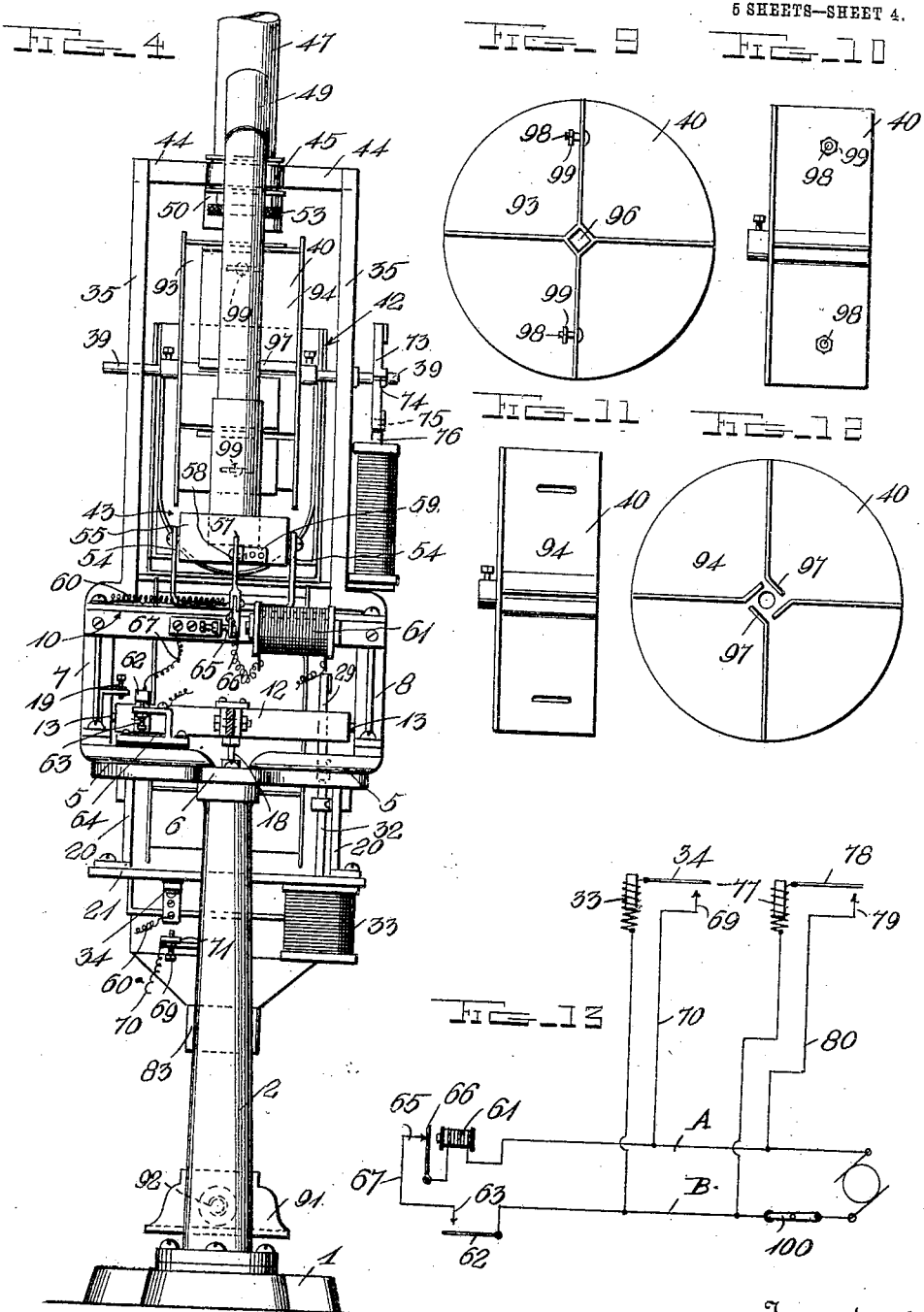

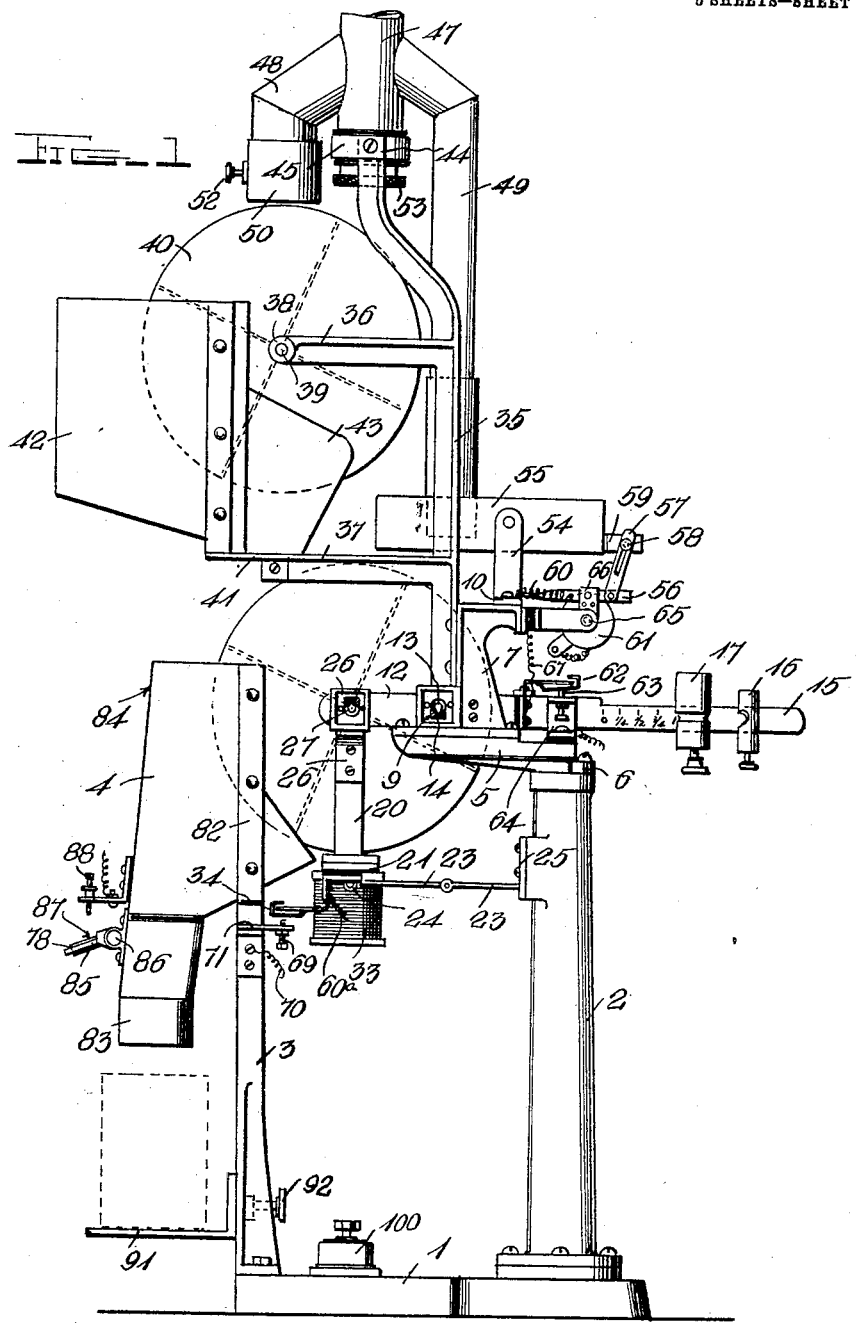

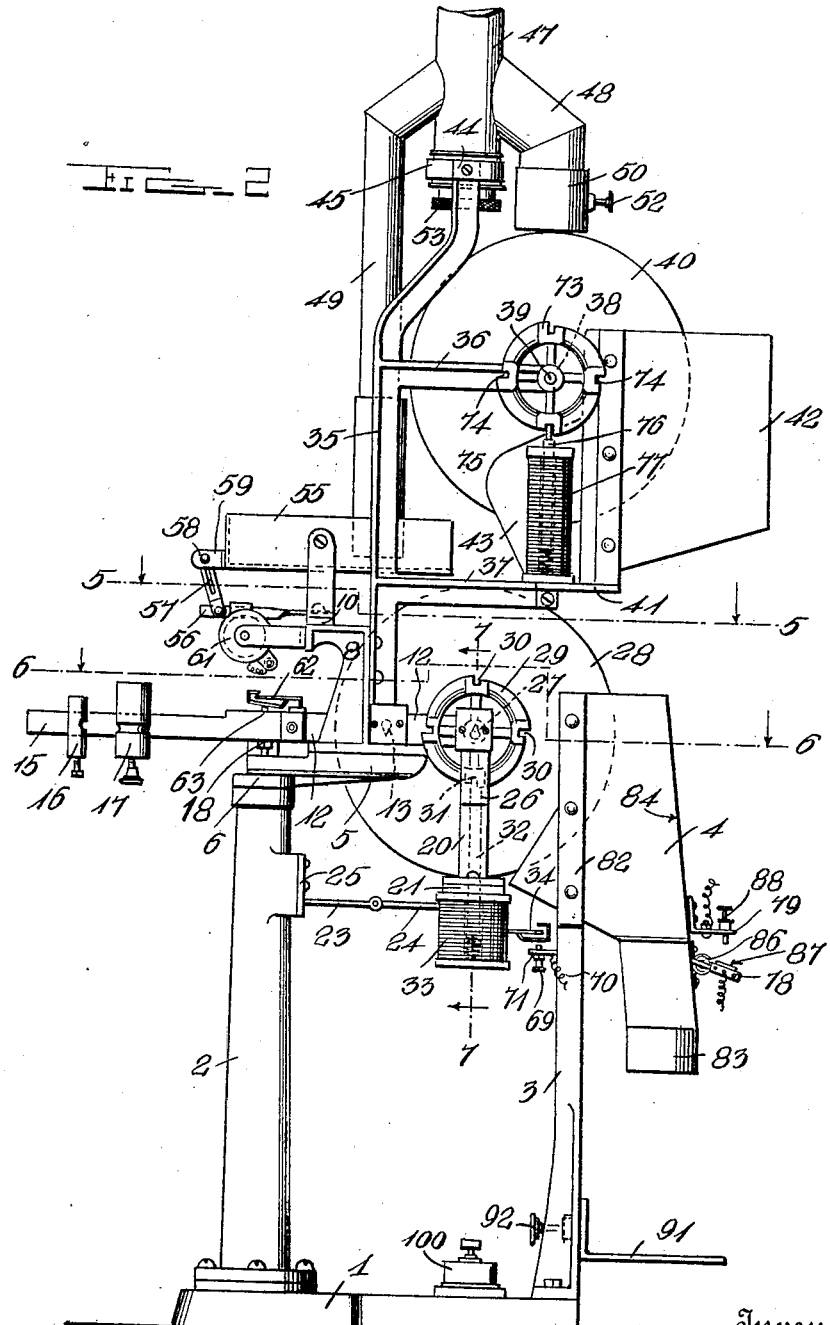

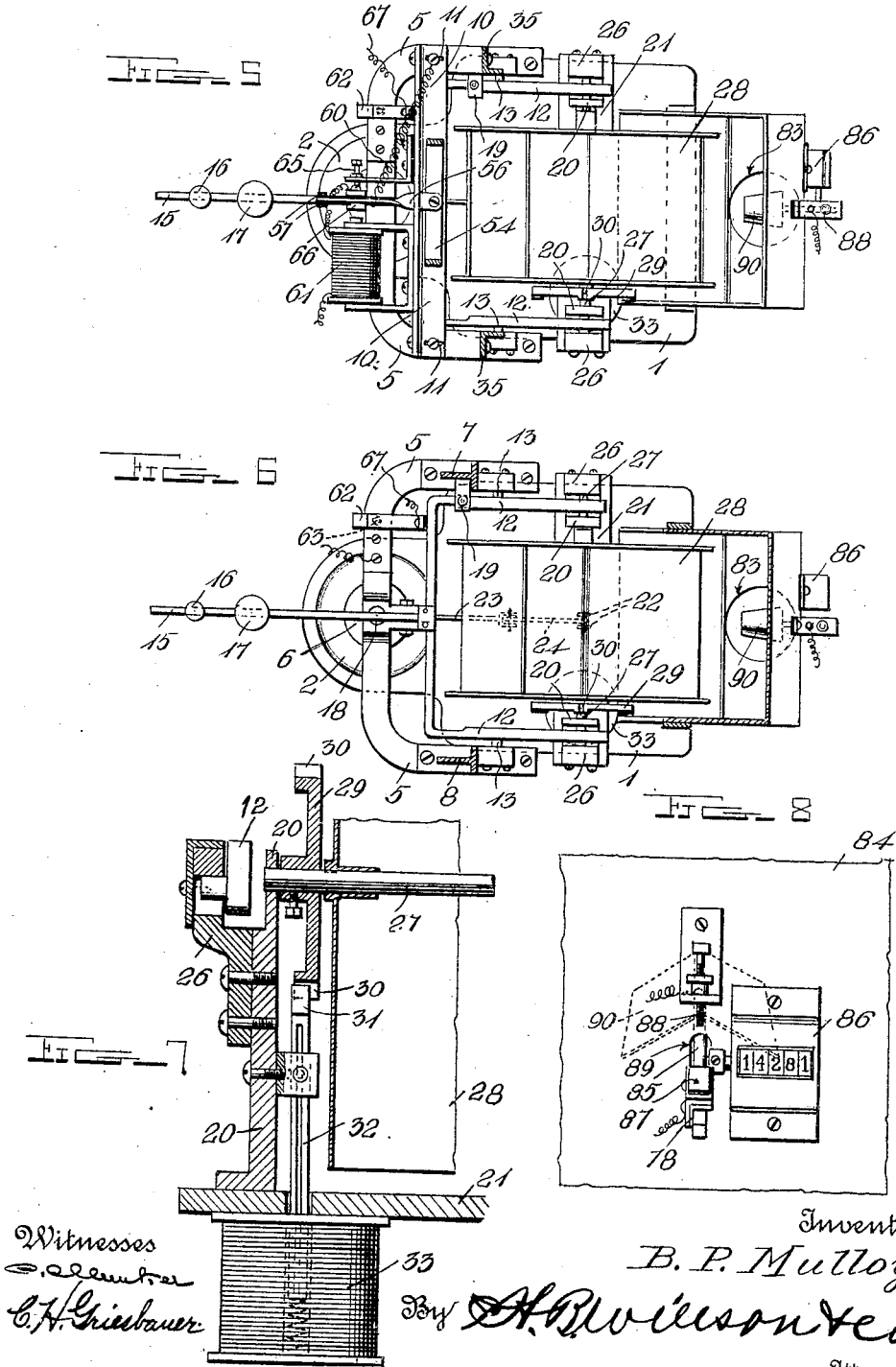

UNITED STATES PATENT OFFICE.

BERNARD P. MULLOY, OF NEW ALBANY, INDIANA.

MEASURING AND WEIGHING MACHINE.

No. 924,570.  Specification of Letters Patent.  Patented June 8, 1909.

Application filed July 27, 1908. Serial No. 445,513.

*To all whom it may concern:*

Be it known that I, BERNARD P. MULLOY, a citizen of the United States, residing at New Albany, in the county of Floyd and State of Indiana, have invented certain new and useful Improvements in Measuring and Weighing Machines; and I do declare the following to be a full, clear, and exact description of the invention, such as will enable others skilled in the art to which it appertains to make and use the same.

My invention relates to measuring and weighing machines, and particularly to that type of machine used for weighing articles in bulk, such as coffee, sugar, rice and the like. The demand for original packages has become so great that in order to supply the trade a more rapid and accurate method of weighing the contents of the package is in much demand. Heretofore weighing machines of this character have been provided with what are known as cut off slides operating at the time the pan or receptacle contained a given amount. They, however, had this objection, the material in the chute between the pan and the cut off slide could never be weighed, and it was customary for instance, when it was desired to weigh a pound to weigh 14 oz. in the pan and allow for approximately 2 oz. between the cut off slide and the pan. This method was, however, not accurate and frequently the packages were found to contain considerably more material than was necessary, or considerably less, as the case might be, owing to a difference in specific gravity of different particles in the same bulk.

It is the object of my invention to obviate these difficulties, and to more accurately weigh the material.

A further object of the invention is the provision of means whereby the measuring scoop may be adjusted for different kinds of material and for different grades of the same material.

With these and other objects in view, the invention consists of certain novel features of construction, combination and arrangement of parts, as will be more fully described and particularly pointed out in the appended claims.

In the accompanying drawings, Figure 1 is an elevation of one side of the machine, Fig. 2 is an elevation of the opposite side, Fig. 3 is a central vertical section, Fig. 4 is a rear end view, Fig. 5 is a horizontal section on the line 5—5 of Fig. 2, Fig. 6 is a similar view on the line 6—6 of Fig. 2, Fig. 7 is a vertical section on the line 7—7 of Fig. 2, Fig. 8 is a detail front elevation of the lower portion of the front end of the device, Fig. 9 is a side elevation of one half of the adjustable measuring receptacle, Fig. 10 is an end elevation thereof, Fig. 11 is an end elevation of the opposite half of the measuring receptacle, Fig. 12 is a side elevation thereof, and Fig. 13 is a diagrammatic view of the circuits employed.

Referring more especially to the drawings, 1 represents a suitable base having projecting from the rear end thereof the scale frame supporting standard 2, and projecting from the front end of the base 1 is a standard 3, which carries the discharge chute 4. The scale frame comprises a U-shaped member 5, horizontally disposed and provided centrally with an attaching disk 6, which rests upon the top of the standard 2. The opposite arms of this frame 5 have projecting therefrom the beam supporting members 7 and 8, which project vertically from the frame 5, and are provided with pintle sockets 9. The upper ends of the members 7 and 8 are bridged by a horizontal strap 10, which lies flat upon the top of the frames, and is provided with slots 11, by which it may be adjusted horizontally.

Mounted between the members 7 and 8 is the scale beam 12, which has its pintle 13, seated against hard metal bearing blocks 14, located in the sockets 9. The forward end of the beam is provided with the usual graduated bar 15, with balance and weighing weights 16 and 17, as is usual. The downward movement of the beam is limited by an adjustable set screw 18, projecting upwardly from the disk 6, and the upward movement of the beam is limited by an adjusting device 19, carried on the inside of the member 7. Depending from the rear end of the beam is a pair of arms 20, which have pivotal connection with the beam similar to the pintle 13 and bearing bushings 14. These arms support a suitable platform 21, which is provided adjacent its center with a pair of depending ears 22, to which is connected the spreader bars 23 and 24, the latter beam pivoted to the ears of the former, which is carried by a plate 25, adjustably carried upon the standard 2. The upper end of the arms 20 are connected to pivot plates 26, and directly opposite they have journaled in their ends the receptacle shaft 27, upon which is keyed the receptacle 28, and also the limiting wheel 29. This wheel is notched around its periphery at four points or more as may be consistent with the number of compartments in the receptacle 28. The notches 30 are formed with the walls thereof higher upon one side than upon the other in the direction of rotation so that the catch 31 will positively engage them and lock the receptacle in position. This catch 31, has a part of a solenoid core 32, which is normally spring pressed into engagement with the wheel 29 by a spring located inside of the solenoid 33, which is carried upon the under side of the platform 21, and is controlled by a spring contact 34, carried at the opposite side of the platform, and which will be described later on.

Projecting up from the members 7 and 8 are suitable standards 35, which carry intermediate their length the outwardly projecting supporting arms 36 and 37, the former having formed in their outer ends the shaft sockets 38, in which is rotatably mounted the measuring receptacle shaft 39, carrying thereon the measuring receptacle 40, to be hereinafter described. The lower arms are connected together by a U-shaped bridge piece 41, which carries on its connecting end a shield or guard 42, which has secured upon its inside a chute or discharge spout 43, leading to a point directly over the receptacle 28. The upper end of the standard 35 projects somewhat above the arms 36, and is provided with a cross piece 44, having a suitable central connecting ring 45, in which is seated the discharge end 46 of the discharge spout 47. This spout may be connected to any suitable source of supply and above the discharge end thereof it is provided with two depending outlets 48 and 49, the former of which extends over the receptacle 40, and is provided upon its end with a removable spout 50, having an inturned flange 51, at its lower end to limit the flow according to the material being measured away. This flange may be larger or smaller as occasion may require, it being understood that its size would naturally be increased as the size of grain in the material decreases, or vice versa. A suitable set screw 52 passes through the discharge spout 50 and clamps it to the pipe 48. The discharge end 46 of the supply tube or pipe is formed for the purpose of weighing material from the hopper above any excess of the limits of the machine, and is preferably closed by a plug 53.

Pivotally supported upon the bridge piece 10 is a U-shaped bracket 54, having pivoted between its ends a tray or scoop-like body 55, which is located immediately under and having its bottom closely adjacent to the discharge end of the down spout 49. The bracket 54 has secured at right angles thereto a lever 56, which at its outer end is provided with a vertical link 57, slotted to receive the adjusting screw 58, which is threaded into a bracket 59, carried upon the rear end of the tray 55. By loosening the screw and shoving the rear end of the tray downwardly on the link 57 it will be seen that the horizontal arrangement of the tray may be properly adjusted for a purpose which will be hereinafter described. The lever 56 is normally held over to the left by a spiral spring 60, which acts in opposition to an electro magnet 61. This electro magnet is wired, as will be seen from an inspection of Fig. 13, on the order of a ringer magnet, and is controlled through a spring contact 62, normally in engagement with the contact 63, carried upon the bracket 64, which is mounted upon one of the arms 5 and insulated therefrom and connected to the source of power, as will be seen. These contacts are normally in engagement with each other and complete the circuit of the electro magnet 61 when the scale beam or bar 15 is down under the influence of the weight 17. The opposite side of the circuit from the electro magnet is through the contact 65, which is normally in contact with the armature 66, carried by the lever 56. The wire 67 leading from the contact 65 leads directly to the contact 63.

The solenoid 33 which controls the locking of the wheel 29 and the consequent position of the receptacle 28 is connected by the wire 60ª with the spring contact 34 which is normally out of engagement with the anvil contact 69, connected by wire 70 to the main supply wire A, the magnet being bridged from A to B supply wires of the supply circuit. The anvil contact is adjustably carried by a bracket 71 mounted on the standard 3 below its top piece.

On the same side of the machine as the wheel 29 I secure a shaft 39 and a similar locking wheel 73, which is provided with the usual notches 74, adapted to be engaged by the registered end 75 of the solenoid core 76, which rests upon a spring within the solenoid 77. The circuit of the solenoid 77 leads from the wire B through the magnet 77 to the movable contact 78, and from the stationary contact 79 when the movable contact is closed thereon, over the wire 80 and back to the supply wire A.

Before describing the operation of the machine it is necessary that a description be given of the discharge chute, 4, which is supported by a U-shaped bracket 82, upon the top of the standard 3. This chute comprises a discharge spout 83, and an upstanding guard plate 84, upon which is mounted the register mechanism which I shall now describe. The contact 79 before spoken of comprises an arm 85 secured transversely to the shaft of a Veeder counter 86, and extending on opposite sides thereof and provides an engaging contact 87, which is adapted to engage the adjustable anvil contact 88, carried upon the front plate 84 of the chute 4. The opposite end of the arm 85 projects through a slot 89, formed in said front plate and terminates on the inner side in a V-shaped fan plate 90, adapted to be engaged by the material flowing through the chute to cause the movable contact to come in engagement with the anvil contact and thereby close the circuit of the solenoid 77, which will draw in its core against the action of the spring therein and release the measuring receptacle 40.

The operation of the device is as follows: A continuous supply of material is fed to the down spout 47 from a hopper situated at any suitable point and allowed to divide so as to take two separate paths, one through the disharge spout 50 and the other through the down spout 49. The material entering the compartments in the receptacle 40 overbalances the same so as to give it a tendency to rotate. The material passing down the down spout 49 piles up upon the tray 55, and is choked in its exit so as to prevent a too rapid flow. After filling the compartment in the receptacle 40 the solenoid is first released by hand so as to dump its contents into the chute 43 and from there into one of the compartments of the receptacle 28. The amount received by the receptacle 28 from the chute 43 and the receptacle 40 is preferably graduated so as to determine the rapidity of the operation. If it is desired to operate the machine at a high rate of speed approximately 15 oz. is dumped into the receptacle 28, and the remaining ounce shaken into the receptacle 28 from the pan 55. While the amount of material now in the receptacle 28 approximates the required amount, one ounce more is necessary to overbalance the weighing weight 17. The contacts 62 and 63 are therefore closed upon each other and the magnet 61 vibrates its armature 66 and through the lever 56 the pan 55. The material from the down spout 47 in the pan 55 is shaken by the action of the magnet 61 into the receptacle 28, thus depositing the required amount to tilt the scale beam and break the contacts 62 and 63, and immediately complete the circuit of the contacts 34 and 69 of the solenoid 33. This magnet being energized withdraws the catch 31 from the notches in the wheel 29, and permits the receptacle 28 to revolve and dump the contents of its lowered compartment into the chute 81. The bulk of material impinging against the fan raises the contact arm 85 so that the contact 87 comes in engagement with the anvil contact 88, and thus completes the circuit of the solenoid 77 so as to release the receptacle 40 and permit it to dump its contents into the chute 43 and into the next compartment of the receptacle 28. This operation of course is continuous until the entire amount of bulk material has been bagged.

The standard 3 is slotted throughout its length so as to receive the guide bar 90, of a bag supporting shelf 91, which is clamped in adjusted position upon the standard by a set screw 92.

In order to regulate the size of the compartments in the receptacle 40 I make the device in two adjustable halves 93 and 94, having four compartments, the former having radiating veins at their center to form a square opening or passage 96, which is adapted to receive the shaft passing therethrough. The fence or partitions of the opposite member 34 are disconnected and have their ends bent at an angle as at 97 and lie flat alongside of the square sides of the opening. Each half is provided with a collar surrounding the shaft through which is passed a suitable set screw by which the halves may be adjusted toward or farther from each other, and suitable clamping screws 98 are provided, which are carried by one of the partitions, and are provided with clamp nuts 99, to securely clamp the partitions of the respective halves together. A suitable snap switch 100 controls the current from the generator G to the supply wires A and B.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim and desire to secure by Letters Patent is:—

1. In a weighing machine, a feed spout, an adjustable measuring receptacle adapted to receive material therefrom, less than the quantity to be weighed, means to hold said receptacle in receiving position, weighing means, a weighing receptacle carried thereby, reciprocating means controlled by the weighing means for supplying the deficit to said weighing receptacle, means controlled by the weighing means for releasing the weighing receptacle, and means controlled by the grain in its descent from the weighing receptacle for releasing the measuring receptacle.

2. In a weighing machine, the combination with a feed chute, an adjustable measuring receptacle adapted to receive material therefrom, less than the required amount, a weighing device, a weighing receptacle carried thereby adapted to receive material from said measuring device, reciprocating means controlled by the weighing device for supplying the deficit to said weighing receptacle, means on the weighing device for holding said weighing receptacle in receiving position, means controlled by the weight of the grain in said receptacle for releasing the same, means controlled by the grain in descent from said grain receptacle for releasing the measuring receptacle, and a registering device controlled thereby.

3. In a device of the class described, an adjustable measuring receptacle, a weighing receptacle adapted to receive the discharge from the measuring receptacle, means acting at a predetermined time to dump the weighing receptacle, a discharge chute, means engaged by the grain in its passage through said chute for controlling the dumping of the measuring receptacle, and a register controlled by said means.

4. In a device of the class described, an adjustable measuring receptacle, a weighing receptacle adapted to receive the discharge from said measuring receptacle, an auxiliary supply for the weighing receptacle, reciprocating means to feed the auxiliary supply to the weighing receptacle and means controlled by the weighing receptacle for controlling said reciprocating means.

5. In a device of the class described, an adjustable measuring receptacle, a weighing device, a weighing receptacle rotatably carried thereby adapted to receive the discharge from said measuring receptacle, a reciprocating feeding device, a pair of feed chutes, one leading to the measuring receptacle, and the other to the feeding device, means to reciprocate said feeding device whereby the material therein may be discharged into the weighing receptacle to overbalance the same upon the weighing device, means acting upon the overbalancing of the weighing receptacle to render inoperative the means for reciprocating the feeding device, means acting simultaneously with the interruption of the feeding means to release the weighing receptacle, a discharge chute, and means in the discharge chute controlled by the grain passing therethrough for releasing the measuring receptacle whereby a new charge may be dumped into the weighing receptacle.

In testimony whereof I have hereunto set my hand in presence of two subscribing witnesses.

BERNARD P. MULLOY.

Witnesses:
E. EDMONSTON, Jr.,
L. M. CURRY.